(12) United States Patent
Frey et al.

(10) Patent No.: US 11,597,989 B2
(45) Date of Patent: Mar. 7, 2023

(54) APPARATUS AND METHODS FOR DEPOSITING MOLTEN METAL ONTO A FOIL SUBSTRATE

(71) Applicant: Micromaterials LLC, Wilmington, DE (US)

(72) Inventors: Bernard Frey, Livermore, CA (US); Subramanya P. Herle, Mountain View, CA (US)

(73) Assignee: APPLIED MATERIALS, INC., Santa Clara, CA (US)

(*) Notice: Subject to any disclaimer, the term of this patent is extended or adjusted under 35 U.S.C. 154(b) by 0 days.

(21) Appl. No.: 17/832,250

(22) Filed: Jun. 3, 2022

(65) Prior Publication Data
US 2022/0298617 A1    Sep. 22, 2022

Related U.S. Application Data

(62) Division of application No. 16/996,506, filed on Aug. 18, 2020, now Pat. No. 11,384,419.

(Continued)

(51) Int. Cl.
*C23C 2/00* (2006.01)
*C23C 2/40* (2006.01)
(Continued)

(52) U.S. Cl.
CPC ............. *C23C 2/003* (2013.01); *B05C 1/08* (2013.01); *B05C 1/0826* (2013.01); *B05C 5/02* (2013.01);
(Continued)

(58) Field of Classification Search
None
See application file for complete search history.

(56) References Cited

U.S. PATENT DOCUMENTS 4,081,005 A * 3/1978 Gray ................... H01M 4/0409
29/623.5
4,250,207 A * 2/1981 Takahashi ................. C23C 2/40
118/223

(Continued)

FOREIGN PATENT DOCUMENTS

WO    2017131997 A1    8/2017
WO    2017/202444 A1   11/2017
(Continued)

*Primary Examiner* — Jethro M. Pence
(74) *Attorney, Agent, or Firm* — Patterson + Sheridan, LLP

(57) ABSTRACT

A web coating platform for depositing molten metal on flexible substrates is provided. The web coating platform can be used for manufacturing solid lithium anodes for use in energy storage devices, for example, rechargeable batteries. The coating platform can be designed for double-sided coating of a continuous flexible substrate (e.g., a copper foil) with molten lithium followed by double-sided lamination or passivation. The coating platform integrates novel coating elements unique to handling and processing molten metals. For example, some implementations of the present disclosure incorporate double-sided molten metal coating elements, which include at least one of a molten metal application assembly (e.g., kiss roller, slot-die, Meyer bar, and/or gravure roller), a primary melt pool assembly, a secondary melt pool assembly, and an engagement mechanism.

20 Claims, 6 Drawing Sheets

Related U.S. Application Data

(60) Provisional application No. 62/894,144, filed on Aug. 30, 2019.

(51) Int. Cl.
| | | |
|---|---|---|
| *H01M 4/04* | (2006.01) | |
| *B05C 5/02* | (2006.01) | |
| *B05C 1/08* | (2006.01) | |
| *H01M 4/02* | (2006.01) | |

(52) U.S. Cl.
CPC ............. *C23C 2/40* (2013.01); *H01M 4/0404* (2013.01); *H01M 4/0409* (2013.01); *H01M 2004/027* (2013.01)

(56) References Cited

U.S. PATENT DOCUMENTS

| | | | | | |
|---|---|---|---|---|---|
| 4,296,145 | A | * | 10/1981 | Higuchi | C23C 2/006 427/349 |
| 4,330,574 | A | * | 5/1982 | Pierson | C23C 2/40 427/349 |
| 4,352,838 | A | * | 10/1982 | Bostroem | C23C 4/14 427/427 |
| 4,408,561 | A | * | 10/1983 | Yokoyama | C21D 9/56 427/432 |
| 4,436,292 | A | * | 3/1984 | Pfannschmidt | C21D 9/56 266/112 |
| 4,444,814 | A | * | 4/1984 | Flinchum | C23C 2/40 427/432 |
| 4,478,892 | A | * | 10/1984 | Amberson | C23C 2/40 427/432 |
| 4,643,131 | A | * | 2/1987 | Umeda | C23C 2/40 118/733 |
| 4,645,694 | A | * | 2/1987 | Gerard | C23C 2/003 427/431 |
| 4,752,508 | A | * | 6/1988 | Sippola | C23C 2/003 427/431 |
| 4,824,746 | A | * | 4/1989 | Belanger | H01M 4/667 429/231.95 |
| 4,911,995 | A | * | 3/1990 | Belanger | H01M 4/0435 428/458 |
| 4,958,589 | A | * | 9/1990 | Homma | C23C 2/003 118/63 |
| 4,971,842 | A | * | 11/1990 | Sippola | C23C 2/14 427/433 |
| 5,020,779 | A | * | 6/1991 | Lindblom | C23C 2/003 266/112 |
| 5,072,689 | A | * | 12/1991 | Nakagawa | C23C 2/003 384/283 |
| 5,073,415 | A | * | 12/1991 | Taylor | C23C 2/003 118/423 |
| 5,252,130 | A | * | 10/1993 | Ookouchi | B22D 17/2023 118/423 |
| 5,279,666 | A | * | 1/1994 | Kastenhuber | B05C 3/125 118/713 |
| 5,538,558 | A | * | 7/1996 | Ookouchi | F16C 35/073 384/907 |
| 5,538,559 | A | * | 7/1996 | Kleimeyer | C23C 2/003 118/423 |
| 5,571,327 | A | * | 11/1996 | Ookouchi | C23C 2/003 492/27 |
| 5,571,328 | A | * | 11/1996 | Newland | C23C 2/003 118/423 |
| 5,722,151 | A | * | 3/1998 | Pleschiutschnigg | C23C 2/40 266/112 |
| 5,912,055 | A | * | 6/1999 | Gore | C23C 2/003 427/431 |
| 5,919,517 | A | * | 7/1999 | Levendusky | B05D 3/02 427/178 |
| 5,958,518 | A | * | 9/1999 | Sippola | C23C 2/003 427/434.5 |
| 6,093,452 | A | * | 7/2000 | Ishii | C23C 2/003 427/431 |
| 6,177,140 | B1 | * | 1/2001 | Patil | C23C 2/003 427/431 |
| 6,364,930 | B1 | * | 4/2002 | Kos | C23C 2/40 75/663 |
| 6,554,904 | B1 | * | 4/2003 | Gimpel | B65G 49/0404 118/423 |
| 6,582,520 | B1 | * | 6/2003 | Boston | C23C 2/003 118/620 |
| 9,453,275 | B2 | * | 9/2016 | Bergen | C23C 2/38 |
| 9,458,530 | B2 | * | 10/2016 | Yamauchi | C23C 2/003 |
| 11,149,336 | B2 | * | 10/2021 | Veg | C23C 2/12 |
| 11,208,711 | B2 | * | 12/2021 | Sippola | C21D 1/19 |
| 2001/0022156 | A1 | * | 9/2001 | Iida | C23C 2/003 118/123 |
| 2002/0076502 | A1 | * | 6/2002 | Ishii | C23C 2/00 427/433 |
| 2003/0077397 | A1 | * | 4/2003 | Kabeya | C23C 2/003 427/598 |
| 2004/0159964 | A1 | * | 8/2004 | Lavoie | H01M 4/139 264/408 |
| 2004/0197578 | A1 | * | 10/2004 | Sinsel | B32B 38/0008 427/535 |
| 2005/0000414 | A1 | * | 1/2005 | Culik | H01L 31/022425 427/256 |
| 2005/0115052 | A1 | * | 6/2005 | Takahashi | C23C 2/40 29/527.4 |
| 2007/0051438 | A1 | * | 3/2007 | Honda | C22C 38/04 148/533 |
| 2007/0074657 | A1 | * | 4/2007 | Hamayoshi | F16C 13/00 118/420 |
| 2008/0206592 | A1 | * | 8/2008 | Kim | C23C 2/16 427/457 |
| 2009/0028478 | A1 | * | 1/2009 | Kim | F16C 33/043 384/203 |
| 2009/0183674 | A1 | * | 7/2009 | Kuwana | C23C 2/06 118/429 |
| 2010/0075133 | A1 | * | 3/2010 | Ikeda | C22C 29/08 427/451 |
| 2010/0175615 | A1 | * | 7/2010 | Fukuda | C23C 2/003 118/63 |
| 2010/0304034 | A1 | * | 12/2010 | Bright | C23C 2/003 427/433 |
| 2010/0307412 | A1 | * | 12/2010 | Barjon | C23C 2/003 118/610 |
| 2011/0067595 | A1 | * | 3/2011 | Bourgier | C23C 2/20 104/139 |
| 2011/0119905 | A1 | * | 5/2011 | Bourgier | C23C 2/003 29/724 |
| 2011/0265604 | A1 | * | 11/2011 | D'Halluin | C23C 2/00 75/414 |
| 2013/0156963 | A1 | * | 6/2013 | Okada | C23C 2/003 427/433 |
| 2013/0156964 | A1 | * | 6/2013 | Okada | C23C 2/06 427/433 |
| 2013/0232811 | A1 | * | 9/2013 | Koga | B05C 3/125 34/241 |
| 2013/0239884 | A1 | * | 9/2013 | Koga | F26B 15/00 118/63 |
| 2013/0263778 | A1 | * | 10/2013 | Kawamura | G05D 5/02 118/419 |
| 2013/0291793 | A1 | * | 11/2013 | Kawamura | C23C 2/003 118/429 |
| 2014/0020622 | A1 | * | 1/2014 | Koga | B05C 17/0247 118/500 |
| 2014/0211361 | A1 | * | 7/2014 | Kurisu | C23C 2/24 361/157 |
| 2014/0227451 | A1 | * | 8/2014 | Setargew | C23C 2/06 427/431 |
| 2014/0366802 | A1 | * | 12/2014 | Itoh | C23C 2/185 118/712 |
| 2015/0132603 | A1 | * | 5/2015 | Liu | C23C 2/28 428/653 |
| 2015/0140225 | A1 | * | 5/2015 | Gusek | C23C 2/20 427/432 |

(56) References Cited

U.S. PATENT DOCUMENTS

| | | | |
|---|---|---|---|
| 2015/0174678 A1* | 6/2015 | Sato | C23C 2/04 228/40 |
| 2015/0176108 A1* | 6/2015 | Edelman | C22C 38/58 148/547 |
| 2015/0259776 A1* | 9/2015 | Shimizu | C23C 2/28 427/398.3 |
| 2015/0361520 A1* | 12/2015 | Takahashi | C23C 2/40 266/111 |
| 2015/0361521 A1* | 12/2015 | Takahashi | C21D 9/5735 266/111 |
| 2015/0368730 A1* | 12/2015 | Larnicol | C21D 6/00 148/636 |
| 2015/0368743 A1* | 12/2015 | Larnicol | C21D 9/46 266/107 |
| 2015/0368777 A1* | 12/2015 | Bergen | C23C 2/04 428/653 |
| 2016/0031651 A1* | 2/2016 | Hsieh | C09J 5/00 198/689.1 |
| 2016/0102393 A1* | 4/2016 | Schaffrath | C23C 2/003 118/712 |
| 2016/0281201 A1* | 9/2016 | Shimizu | C23C 22/78 |
| 2016/0304984 A1* | 10/2016 | Genaud | C23G 3/027 |
| 2016/0305003 A1* | 10/2016 | Shimizu | C23C 2/40 |
| 2017/0009326 A1* | 1/2017 | Yonekura | C23C 2/003 |
| 2017/0072512 A1* | 3/2017 | Umehara | B23K 26/0838 |
| 2017/0130296 A1* | 5/2017 | Takeda | C23C 2/02 |
| 2017/0211165 A1* | 7/2017 | Nishizawa | C23C 2/06 |
| 2017/0324073 A1 | 11/2017 | Herle | |
| 2017/0343040 A1* | 11/2017 | Jendrischik | C23C 2/003 |
| 2017/0365854 A1 | 12/2017 | Gopalakrishnannair et al. | |
| 2018/0051356 A1* | 2/2018 | Takeda | C21D 1/74 |
| 2018/0085778 A1* | 3/2018 | Guastini | H01F 7/06 |
| 2018/0105916 A1* | 4/2018 | Takahashi | C22C 38/002 |
| 2018/0187716 A1* | 7/2018 | Bergen | C23C 2/003 |
| 2018/0237896 A1* | 8/2018 | Takeda | C23C 2/28 |
| 2018/0251879 A1* | 9/2018 | Yonekura | C23C 2/40 |
| 2018/0305802 A1* | 10/2018 | Sakamoto | B32B 15/043 |
| 2019/0085437 A1* | 3/2019 | Nishizawa | C23C 2/40 |
| 2019/0088987 A1 | 3/2019 | Herle | |
| 2019/0140267 A1 | 5/2019 | Gopalakrishnan Nair et al. | |
| 2019/0161842 A1* | 5/2019 | Niedringhaus | C23C 2/003 |
| 2019/0190000 A1* | 6/2019 | Herle | H01M 4/1395 |
| 2019/0194790 A1* | 6/2019 | Cadotte | C23C 2/003 |
| 2019/0300997 A1* | 10/2019 | Terasaki | C23C 2/20 |
| 2019/0360084 A1* | 11/2019 | Li | C23C 2/003 |
| 2019/0376171 A1* | 12/2019 | Cadotte | C23C 2/12 |
| 2020/0002153 A1 | 1/2020 | Delmas et al. | |
| 2020/0087770 A1* | 3/2020 | Takeuchi | C22C 38/60 |
| 2020/0140985 A1* | 5/2020 | Link | C23C 2/003 |
| 2020/0157670 A1* | 5/2020 | Sippola | C21D 1/20 |
| 2020/0171513 A1* | 6/2020 | Nishimura | C23C 2/003 |
| 2020/0173003 A1* | 6/2020 | Van Veldhuizen | B32B 1/00 |
| 2020/0189874 A1 | 6/2020 | Ishikawa et al. | |
| 2020/0190652 A1* | 6/2020 | Takeda | C21D 3/04 |
| 2020/0208247 A1* | 7/2020 | Kayama | C23C 2/40 |
| 2020/0239994 A1* | 7/2020 | Matsuura | C23C 2/003 |
| 2020/0261957 A1* | 8/2020 | Yonekura | B21D 1/02 |
| 2020/0299799 A1* | 9/2020 | Takeda | C23C 2/003 |
| 2020/0377964 A1* | 12/2020 | Takeda | C22C 38/04 |
| 2020/0392614 A1* | 12/2020 | Ishii | C23C 2/40 |
| 2021/0002752 A1* | 1/2021 | Furukawa | C23C 2/40 |
| 2021/0054491 A1* | 2/2021 | Kurisu | C23C 2/40 |
| 2021/0060638 A1* | 3/2021 | Herle | H01M 4/382 |
| 2021/0062318 A1* | 3/2021 | Frey | H01M 4/0404 |
| 2021/0115546 A1* | 4/2021 | Kawabata | C23C 2/003 |
| 2021/0332468 A1* | 10/2021 | Kweon | C23C 2/003 |
| 2021/0381092 A1* | 12/2021 | Dubois | C23C 2/12 |

FOREIGN PATENT DOCUMENTS

| | | |
|---|---|---|
| WO | 2018/001523 A1 | 1/2018 |
| WO | 2018005038 A1 | 1/2018 |
| WO | 2019246095 A1 | 12/2019 |

\* cited by examiner

APPARATUS AND METHODS FOR DEPOSITING MOLTEN METAL ONTO A FOIL SUBSTRATE

CROSS-REFERENCE TO RELATED APPLICATIONS

This application is a divisional of U.S. application Ser. No. 16/996,506, filed Aug. 18, 2020, which claims benefit of U.S. Prov. Appl. No. 62/894,144, filed Aug. 30, 2019, which are herein incorporated by reference in their entirety.

BACKGROUND

Field

Implementations described herein generally relate to continuous web processing systems and more specifically to systems and methods for deposition of molten metals on continuous web substrates.

Description of the Related Art

Flexible substrates are utilized in many applications in the manufacture of energy storage devices. One such application is the deposition of materials onto a flexible substrate in the manufacture of high-capacity energy storage devices, such as lithium-ion (Li-ion) batteries.

The current generation of energy storage devices (e.g., Li-ion batteries) use graphite based negative electrode deposited on thin copper substrates (e.g., ~8 μm). A new negative electrode with high energy density is needed to improve energy density of the energy storage device. Alkali metal anodes (e.g., lithium metal anodes) are believed to provide the targeted high energy density. However, current alkali metal deposition processes including extrusion and evaporation suffer from several deficiencies. For example, extruding alkali metal to high-purity single digit micron thickness suitable for negative electrodes is difficult if not impossible. Lithium deposition by evaporation using powder lithium sources present several safety related issues. Thus, there is no practical solution for high throughput high purity alkali metal deposition for lithiation and alkali metal anodes.

One method for manufacturing anode electrodes and cathode electrodes for energy storage devices is principally based on depositing thin films of cathodically active or anodically active material onto a flexible substrate serving as a conductive current collector. Conventionally, the flexible substrate is referred to as a web that is wound through a series of rotatable rollers in a deposition apparatus. Deposition onto the web is performed on or between the rollers. Drying of the deposited material can be performed on or between the rollers after the deposition.

However, deposition of molten metals on continuous web substrates presents several challenges. For example, contact between the molten metal and continuous web material often leads to expansion of the continuous web material. Due to this expansion of the continuous web material, conventional deposition systems have issues with controlling the flatness and/or deflection of the web during deposition. For example, deflection in an axial direction and/or a cross-web direction causes non-uniform deposition resulting in non-uniform thicknesses in the deposited material.

Accordingly, there is a need in the art for methods, systems and apparatus for deposition of molten metals on continuous web substrates.

SUMMARY

Implementations described herein generally relate to continuous web processing systems and more specifically to systems and methods for deposition of molten metals on continuous web substrates. In one aspect, a system is provided. The system includes a chamber body defining an interior volume, a first partition plate extending across the interior volume separating the interior volume into a processing volume and an unwinding volume, a second partition plate extending across the interior volume separating the interior volume into the processing volume and a winding volume, a reel-to-reel system operable to transport a continuous flexible substrate, and a molten metal coating assembly positioned in the processing volume. The reel-to-reel system includes an unwinding roller positioned in the unwinding volume, on which the continuous flexible substrate is wound prior to processing, and operable to unwind and release the continuous flexible substrate for processing. The reel-to-reel system further includes a winding roller positioned in the winding volume and operable to receive the continuous flexible substrate following processing, and operable to wind the continuous flexible substrate thereon. The molten metal coating assembly includes a kiss roller having a surface that picks up by contact a wet film comprising molten metal and deposits the wet film on the continuous flexible substrate, a primary melt pool operable to supply the molten metal to the kiss roller, a secondary melt pool operable to replenish the molten metal in the primary melt pool, and an engagement mechanism coupled with the secondary melt pool and operable to move the secondary melt pool radially toward and radially away from the primary melt pool.

Implementations can include one or more of the following. The system further includes a Meyer rod positioned downstream from the kiss roller and upstream from the winding roller, and operable to control a shape of the molten metal deposited on the continuous flexible substrate by the kiss roller. The system further includes a laminate film supply roller positioned in the winding volume and operable to supply a laminate film over the deposited molten metal. The system further includes one or more auxiliary tension reels disposed along a travel path where the continuous flexible substrate is conveyed between the unwinding roller, the kiss roller, and the winding roller. The engagement mechanism is a pneumatic cylinder. The kiss roller includes one or more internal heaters. The surface of the kiss roller is a convex surface. The primary melt pool is positioned on a heater operable to maintain the molten metal in a molten state.

In another aspect, a system is provided The system includes a chamber body defining an interior volume, a first partition plate extending across the interior volume separating the interior volume into a processing volume and an unwinding volume, a second partition plate extending across the interior volume separating the interior volume into the processing volume and a winding volume, a reel-to-reel system operable to transport a continuous flexible substrate, and a molten metal coating assembly positioned in the processing volume. The reel-to-reel system includes an unwinding roller positioned in the unwinding volume, on which the continuous flexible substrate is wound prior to processing, and operable to unwind and release the continuous flexible substrate for processing. The reel-to-reel system further includes a winding roller positioned in the winding volume and operable to receive the continuous flexible substrate following processing, and operable to wind the continuous flexible substrate thereon. The molten metal coating assembly includes a first slot-die operable to deposit a wet film comprising molten metal on a first surface of the continuous flexible substrate, a primary melt pool operable to supply the molten metal to the first slot-die, a secondary melt pool operable to replenish the molten metal in the primary melt pool, and an engagement mechanism coupled with the secondary melt pool and operable to move the secondary melt pool radially toward and radially away from the primary melt pool.

Implementations can include one or more of the following. The system further includes a second slot-die operable to deposit the wet film comprising molten metal on a second surface of the continuous flexible substrate. The first slot-die includes one or more internal heaters operable to control a temperature of the molten metal within the first slot-die. The system further includes one or more process rollers disposed along a travel path over which the continuous flexible substrate is conveyed between the unwinding roller, the first slot-die, and the winding roller. The process rollers are positioned so that the first slot-die deposits molten metal on the continuous flexible substrate while the continuous flexible substrate travels over one of the process rollers. The process rollers further include an internal heater. The system further includes a laminate film supply roller positioned in the winding volume and operable to supply a laminate film over the deposited molten metal. The system further includes one or more auxiliary tension reels disposed along a travel path where the continuous flexible substrate is conveyed between the unwinding roller, the first slot-die, and the winding roller. The engagement mechanism is a pneumatic cylinder. The primary melt pool is positioned on a heater operable to maintain the molten metal in a molten state.

In yet another aspect, a system is provided. The system includes a chamber body defining an interior volume, a first partition plate extending across the interior volume separating the interior volume into a processing volume and an unwinding volume, a second partition plate extending across the interior volume separating the interior volume into the processing volume and a winding volume, a reel-to-reel system operable to transport a continuous flexible substrate, and a molten metal coating assembly positioned in the processing volume. The reel-to-reel system includes an unwinding roller positioned in the unwinding volume, on which the continuous flexible substrate is wound prior to processing, and operable to unwind and release the continuous flexible substrate for processing. The reel-to-reel system further includes a winding roller positioned in the winding volume and operable to receive the continuous flexible substrate following processing, and operable to wind the continuous flexible substrate thereon. The molten metal coating assembly further includes a gravure roller having a patterned surface that picks up by contact a wet film comprising molten metal and deposits the wet film on the continuous flexible substrate, a primary melt pool operable to supply the molten metal to the gravure roller, a secondary melt pool operable to replenish the molten metal in the primary melt pool, and an engagement mechanism coupled with the secondary melt pool and operable to move the secondary melt pool radially toward and radially away from the primary melt pool.

Implementations can include one or more of the following. The system further includes a doctor blade positioned to removes excess molten metal from the gravure roller so that only patterned portions of the patterned surface of the gravure roller hold molten metal. The system further includes a laminate film supply roller positioned in the winding volume and operable to supply a laminate film over the deposited molten metal. The system further includes one or more auxiliary tension reels disposed along a travel path where the continuous flexible substrate is conveyed between the unwinding roller, the gravure roller, and the winding roller. The engagement mechanism is a pneumatic cylinder. The gravure roller includes one or more internal heaters. The primary melt pool is positioned on a heater operable to maintain the molten metal in a molten state.

In yet another aspect, a non-transitory computer readable medium has stored thereon instructions, which, when executed by a processor, causes the process to perform operations of the above apparatus and/or method.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1A:
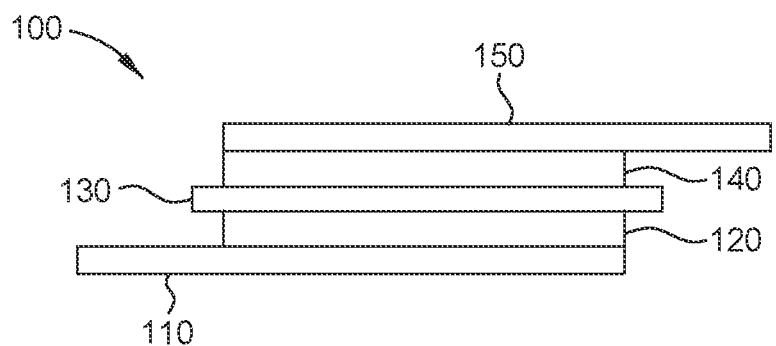
FIG. 1A illustrates a cross-sectional view of one implementation of an energy storage device including a lithium electrode structure formed according to one or more implementations described herein.

To facilitate understanding, identical reference numerals have been used, where possible, to designate identical elements that are common to the figures. It is contemplated that elements and features of one implementation can be beneficially incorporated in other implementations without further recitation.

DETAILED DESCRIPTION

The following disclosure describes energy storage devices, for example, anode electrodes, high performance electrochemical cells, capacitors and batteries including the aforementioned electrodes, and apparatus and methods for fabricating the same. Certain details are set forth in the following description and in FIGS. 1A-6 to provide a thorough understanding of various implementations of the disclosure. Other details describing well-known structures and systems often associated with molten metal deposition and energy storage devices are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Generally, for molten metal deposition, the molten metal remains in a molten state prior to deposition onto the substrate. However, premature solidification can change the state of the molten material such that a material transfer onto the substrate is no longer possible by wetting, spreading and solidification. A slight drop in temperature can alter the viscosity of the material to the point that the material transfer and the flow behavior of the molten material leads to inconsistent deposition thicknesses and non-uniformities. Adhesion and "stickiness" of some materials, for example, lithium, change dramatically with temperature. A slight drop in temperature can lead to a stickiness, or viscosity change and partial solidification that can tear the substrate material. For these reasons, in some implementations, the surface temperature of the deposition applicators should remain above the melt temperature of the metal. There are multiple methods of heating and controlling a surface temperature of such applicators. The heating method can change with the size and operational parameters of the applicator, being a rotating roller (e.g., kiss roller, Meyer bar, or gravure roller) or a stationary bar (e.g., comma bar, doctor blade).

Implementations described herein will be described below in reference to a roll-to-roll coating system. The apparatus description described herein is illustrative and should not be construed or interpreted as limiting the scope of the implementations described herein. It should also be understood that although described as a roll-to-roll process, the implementations described herein can be performed on discrete substrates.

Implementations described herein refer to a roll-to-roll coating system adapted for deposition of molten metal on a flexible substrate such as a web used for example, for lithium-ion battery devices. In particular, the roll-to-roll coating system is adapted for continuous processing of a flexible substrate such as a web unwound from an unwinding module. In some implementations, the roll-to-roll coating system is configured in a modular design, for example, an appropriate number of process modules can be arranged adjacent to each other in a processing line, and the flexible substrate is inserted into the first process module and can be ejected from the last process module of the line. Furthermore, the entire roll-to-roll coating system can be reconfigured if a change of individual processing operations is targeted.

According to some implementations described herein, the direct deposition of low melting metal or alloys can be done either in vacuum conditions or suitable atmospheric ambient. Some typical examples of low melting temperature elements (e.g., below 700 degree Celsius; below 800 degree Celsius; or below 1,000 degree Celsius) that can be deposited using the implementations described herein are alkali metal (e.g., lithium and sodium), magnesium, zinc, cadmium, aluminum, gallium, indium, thallium, tin, lead, antimony, bismuth, and tellurium. In one implementation, the low melting temperature metal is selected from the group consisting of alkali metals, magnesium, zinc, cadmium, aluminum, gallium, indium, thallium, tin, lead, antimony, bismuth, and tellurium, alkali earth metals, silver, and combinations thereof. In some implementations, the molten metal is formed from metals having a melting temperature less than 1,000 degrees Celsius. In some implementations, the molten metal is formed from an alkali metal source. In some implementations, the molten metal is formed from a lithium metal source. In some implementations, the molten metal is molten lithium.

The term substrate as used herein can be considered to include among other things, webs, flexible materials, porous polymeric materials, films, current collectors, conductive films (e.g., copper or aluminum), foils, webs, strips of plastic material, metal, paper, or other materials. The term substrate shall also embrace other types of flexible substrates. A flexible substrate can be moved while being processed in a vacuum chamber. For example, the flexible substrate is transported along a substrate transportation path past coating devices while being coated. In some implementations, the substrate can be unwound from a first roll, transported over the outer surface of a processing drum, e.g. a coating drum, and guided along the outer surfaces of additional rollers or drums. The coated flexible substrate is then wound onto a second roll. Typically, the terms "web," "foil," "strip," "substrate" and the like are used synonymously.

Substrates, e.g. webs and foils, for use in implementations described herein can be planar substrates with flat main surfaces or can be non-planar substrates with uneven surfaces. Substrates can also have both planar and non-planar surfaces.

In one or more implementations, the substrate can include, but is not limited to, a plastic sheet or web, a plastic film, paper sheet, fiber structure, or web, or any other type of substrate. In one or more implementations, the term substrate includes multi-layer structures. For example, a polymer film coated with one or more metallic layers, such as a copper film, and deposited on a polymer substrate.

It is noted that while the particular substrate on which some implementations described herein can be practiced is not limited, it is particularly beneficial to practice the implementations on flexible substrates, including for example, web-based substrates, panels and discrete sheets. The substrate can also be in the form of a foil, a film, or a thin plate.

It is also noted here that a flexible substrate or web as used within the implementations described herein can typically be characterized in that it is bendable. The term "web" can be synonymously used to the term "strip" or the term "flexible substrate." For example, the web as described in implementations herein can be a foil.

It is further noted that in some implementations where the substrate is a vertically oriented substrate, the vertically oriented substrate can be angled relative to a vertical plane. For example, in some implementations, the substrate can be angled from between about 1 degree to about 20 degrees from the vertical plane. In some implementations where the substrate is a horizontally oriented substrate, the horizontally oriented substrate can be angled relative to a horizontal plane. For example, in some implementations, the substrate can be angled from between about 1 degree to about 20 degrees from the horizontal plane. As used herein, the term "vertical" is defined as a major surface or deposition surface of the flexible conductive substrate being perpendicular relative to the horizon. As used herein, the term "horizontal" is defined as a major surface or deposition surface of the flexible conductive substrate being parallel relative to the horizon.

Solid lithium metal anodes for rechargeable battery manufacture are typically composed of a six to ten micron thick or thicker copper foil coated on both sides with lithium metal. The lithium metal thickness typically depends on the deposition method and parameter chosen. For example, for kiss roller coating, the ranges from one to ten microns and is generally equal thickness on both sides. In some implementations, the lithium metal thickness ranges from eight to twenty microns.

Numerous methods exist for producing double-sided lithium metal anodes. Methods are either a single deposition pass process on each face in a serial process or a simultaneous double-sided deposition pass process. Deposition modes differ in the temperature and physical state (e.g., solid, liquid, or vapor) of the lithium used to coat the copper foil.

In some implementations, a web coating platform for depositing molten metal on flexible substrates is provided. The web coating platform can be used for manufacturing solid lithium anodes for use in energy storage devices, for example, rechargeable batteries. The coating platform can be designed for double-sided coating of a continuous flexible substrate (e.g., a copper foil) with molten lithium followed by double-sided lamination or passivation. The double-sided coating can be achieved by simultaneous deposition on opposing sides of the continuous flexible substrate. The double-sided coating can be achieved by sequential deposition on opposing sides of the continuous flexible substrate. The coating platform integrates novel coating elements unique to handling and processing molten metals. For example, some implementations of the present disclosure incorporate double-sided molten metal coating elements, which include at least one of a molten metal application assembly (e.g., kiss roller, slot-die, Meyer bar, and/or gravure roller), a primary melt pool assembly, a secondary melt pool assembly, and an engagement mechanism.

In some implementations, the molten metal application assembly is heated. The molten metal application assembly can be heated by, for example, a coaxial cartridge heater, which keeps the wetted surfaces above the metal media melting temperature to prevent premature solidification of the molten metal. The molten metal application assembly also functions as a metering device controlling the gap and shape of the downstream molten metal meniscus. Controlling the gap and shape of the downstream molten metal meniscus helps control the coating thickness.

In some implementations, where the molten metal application assembly includes rollers, the rollers include sliding portions. The sliding portions are axially separated from the wetted portions and sized to provide minimal friction against the substrate. The molten metal application assembly is supported by slide assemblies at each end and thus operable to travel radially relative to the substrate. In some implementations, to ensure continuous contact of the sliding portions with the web the movable part of the slides is spring loaded. Constant force hydraulic cylinders, constant force pneumatic cylinders, and motorized sliders are alternatives. Preloading the molten metal application assembly against the web compensates for the thermal expansion of the gap defining components during thermal ramping and changes.

In some implementations, the primary melt pool supplies molten metal to the molten metal application assembly enabling the transfer of molten metal onto the continuous flexible substrate. The secondary metal pool replenishes the supply of molten metal in the primary melt pool. The primary melt pool and the secondary melt pool are each independently heated. Each melt pool can be heated by one or more cartridge heaters, which keep the molten metal in the molten state. In addition, the molten metal coating process is typically sensitive to temperature fluctuations, which change the rheological parameters of the molten metal. The secondary melt pool replenishes the primary melt pool with molten metal at a controlled temperature. Since the two pools are decoupled from each other, the secondary melt pool can be used to melt metal ingots.

As the molten metal is transferred from the primary melt pool to the substrate via the molten metal application assembly, the liquid level in the primary melt pool is depleted over time. Pool level changes can have adverse consequences on the film thickness uniformity. Several methods can be applied to replenish the primary melt pool. Matching the depletion rate precisely with the replenishing rate is not trivial since process changes affect the depletion rate directly. In general, the flow rates are relatively low in the case of thin films, for example, in the range of one to tens of microns. In one implementations, the primary melt pool is overflowed by oversupplying fresh melt. The secondary melt pool can be used for pre-melting the metal and periodically pouring the molten metal into the primary melt pool. In one example, the secondary melt pool is a hinged pool and an actuator controls the tilt of the secondary melt pool causing the molten metal to flow over a ledge into the primary melt pool. A load cell signal can provide a direct weight measurement of the primary pool, which is fed back to a controller. One or more sensors (optical, capacitive, ultrasonic or the like) can be used to detect the lower and upper level range respectively and provide the signals to the controller for the actuator motion. The actuator can be a pneumatic cylinder plumbed to a proportional control valve.

In some implementations where the molten metal is molten lithium, another feature can be added to the secondary melt pool. Lithium typically has contaminants, for example, $Li_2O_3$, $LiN_3$, that have a tendency to float on top of the melt due to the very high surface tension. Relatively heavy contaminants sink to the bottom of the melt. These heavy contaminants are not desirable in the final deposited film and thus should remain outside of the primary melt pool. The replenishment melt comes from somewhere between the bottom and the top of the secondary melt pool. A spout is positioned in the secondary melt pool that enables molten metal being drawn form a zone with minimal contaminant concentration.

Since the molten metal application assembly and melt pools are maintained at a temperature above the melt temperature of the metal, handling and routing of the continuous flexible substrate can become difficult due to thermal expansion if the path cannot be expanded. In one implementation, the engagement mechanism provides separation of the molten metal application assembly from the supported continuous flexible substrate. This separation allows for thermal expansion of the continuous flexible substrate without damaging the continuous flexible substrate.

In operation, the molten metal application assembly and melt pools are heated. In one example, the secondary melt pool is used to melt the metal ingots and maintain ample supply to compensate for refilling the depleted molten metal from the primary melt pool. The primary melt pool is either used to melt the initial ingots or filled from the secondary melt pool. Once there is enough molten metal available in the primary melt pool, the comma bar assembly is exposed to a wetting process. In some implementations, the molten metal application assembly is heated during the wetting process. Next, the continuous flexible substrate is advanced and the molten metal application assembly is engaged with the continuous flexible substrate. The molten metal is then transferred onto and coats the continuous flexible substrate in a defined manner (width and thickness). This process is sustained until a targeted length of the flexible substrate is coated. At the end of the coating process, the molten metal application assembly is disengaged from the continuous flexible substrate to avoid overexposure. The metal can be solidified and melted again for the next run.

In some implementations where the molten metal is highly reactive (e.g., molten lithium), the comma bar coating process is performed inside an argon environment due to the reactivity of the molten metal material. Both the process and continuous flexible substrate handling assembly are positioned inside a sealed processing environment filled with argon having controlled moisture and oxygen levels. An automated control mechanism can be used to control the level of molten metal in the primary and/or secondary melt pools with the help of a pump or a pressurized source tank, a level sensor, a shut-off valve and control logic. Argon gas can be recycled using for example, an air compressor.

FIG. 1A illustrates a cross-sectional view of one implementation of an energy storage device 100 including a lithium electrode structure formed according to implementations described herein. The energy storage device 100 can be a lithium-ion energy storage device that uses solid electrolytes (e.g., a solid-state battery) as well as a lithium-ion energy storage device, which uses a liquid or polymer electrolyte. In some implementations, the energy storage device 100 is a capacitor (e.g., supercapacitor or ultracapacitor). In some implementations, the energy storage device 100 is combined with other cells to form a rechargeable battery or capacitor. The energy storage device 100 has a positive current collector 110, a positive electrode structure 120, a separator 130, a negative electrode structure 140, and a negative current collector 150. The negative electrode structure is a lithium electrode structure formed according to implementations described herein. Note in FIG. 1A that the current collectors are shown to extend beyond the stack, although it is not necessary for the current collectors to extend beyond the stack, the portions extending beyond the stack can be used as tabs.

The current collectors 110, 150, on positive electrode structure 120 and negative electrode structure 140, respectively, can be identical or different electronic conductors. Examples of metals that the current collectors 110, 150 can be comprised of include aluminum (Al), copper (Cu), zinc (Zn), nickel (Ni), cobalt (Co), tin (Sn), silicon (Si), manganese (Mn), magnesium (Mg), alloys thereof, and combinations thereof. The current collectors 110, 150 can include metal (e.g., copper) deposited on a substrate, such as, a polymer substrate.

In some implementations, the negative electrode structure 140 is a lithium metal film or a lithium metal alloy film formed according to implementations described herein. In some implementations, where the negative electrode structure 140 includes lithium metal, the lithium metal can be deposited using the molten metal application assembly and the methods described herein. The negative electrode structure 140 can be constructed from lithium metal, a lithium alloy foil (e.g. lithium aluminum alloys), or a mixture of a lithium metal and/or lithium alloy and materials such as carbon (e.g. coke, graphite), nickel, copper, tin, indium, silicon, oxides thereof, or combinations thereof. In some implementations, the negative electrode structure 140 has a thickness from about 0.5 µm to about 20 µm (e.g., from about 1 µm to about 10 µm; from about 5 µm to about 10 µm).

In some implementations, the negative electrode 140 is constructed from a graphite, silicon-containing graphite (e.g., silicon (<5%) blended graphite), a lithium metal foil or a lithium alloy foil (e.g. lithium aluminum alloys), or a mixture of a lithium metal and/or lithium alloy and materials such as carbon (e.g. coke, graphite), nickel, copper, tin, indium, silicon, oxides thereof, or combinations thereof. The negative electrode 140 includes intercalation compounds containing lithium or insertion compounds containing lithium.

In some implementations, where the negative electrode 140 is constructed from graphite or silicon-containing graphite, a pre-lithiation layer (e.g., lithium metal film) is formed on the negative electrode 140 using the systems and processes described herein. The lithium metal film replenishes lithium lost from first cycle capacity loss of the negative electrode 140. The lithium metal film can be a thin lithium metal film (e.g., 20 microns or less; from about 1 micron to about 20 microns; or from about 2 microns to about 10 microns).

The positive electrode structure 120 or cathode can be any material compatible with the anode and can include an intercalation compound, an insertion compound, or an electrochemically active polymer. Suitable intercalation materials include, for example, lithium-containing metal oxides, $MoS_2$, $FeS_2$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable lithium-containing oxides can be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Suitable phosphates can be iron olivine ($LiFePO_4$) and it is variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates can be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates can be $Li_2FeSiO_4$, $Li_2MnSiO_4$, or $Li_2VOSiO_4$. An exemplary non-lithium compound is $Na_5V_2(PO_4)_2F_3$.

In some implementations of a lithium-ion cell according to the present disclosure, the negative electrode structure 140 is a lithium metal film formed according to methods described herein and the positive electrode structure 120 is lithium manganese oxide ($LiMnO_4$) or lithium cobalt oxide ($LiCoO_2$). The energy storage device 100, even though shown as a planar structure, can also be formed into a cylinder by reeling the stack of layers; furthermore, other cell configurations (e.g., prismatic cells, button cells) can be formed.

In one implementation, the separator 130 is a porous polymeric ion-conducting polymeric substrate. In one implementation, the porous polymeric substrate is a multi-layer polymeric substrate. In some implementations, the separator 130 includes any commercially available polymeric microporous membranes (e.g., single or multi-ply), for example, those products produced by Polypore (Celgard® LLC., of Charlotte, N.C.), Toray Tonen (Battery separator film (BSF)), SK Energy (lithium ion battery separator (LiBS), Evonik industries (SEPARION® ceramic separator membrane), Asahi Kasei (Hipore™ polyolefin flat film membrane), and DuPont (Energain®). In some implementations, where the energy storage device 100 is a solid-state storage device, the separator 130 is replaced with a solid-state electrolyte layer.

In some implementations, the electrolyte infused in cell components 120, 130, and 140 is comprised of a liquid/gel or a solid polymer and can be different in each. In some implementations, the electrolyte primarily includes a salt and a medium (e.g., in a liquid electrolyte, the medium can be referred to as a solvent; in a gel electrolyte, the medium can be a polymer matrix). The salt can be a lithium salt. The lithium salt can include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, Minn.) and combinations thereof.

Figure 1B:
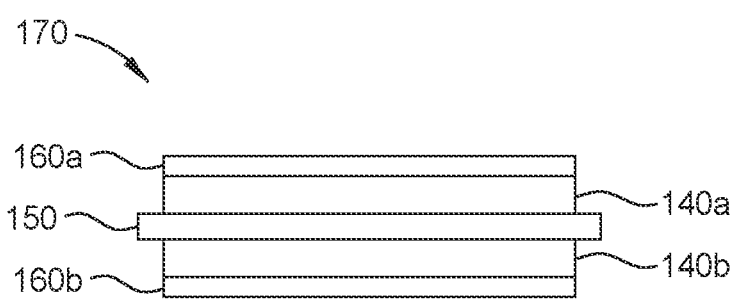
FIG. 1B illustrates a cross-sectional view of a dual-sided electrode structure incorporating a lithium electrode structure formed according to one or more implementations described herein.

FIG. 1B illustrates a cross-sectional view of a dual-sided electrode structure 170 that is formed according to implementations described herein. The dual-sided electrode structure 170 can be combined with a cathode electrode structure to form an energy storage device. Although the dual-sided electrode structure 170 is depicted as a dual-sided electrode structure, it should be understood that the implementations described herein also apply to single-sided electrode structures. The dual-sided electrode structure 170 includes the negative current collector 150 with a negative electrode structure 140a, 140b (collectively 140) formed on opposing sides of the negative current collector 150.

In some implementations, the negative electrode structures 140a, 140b each have a protective film 160a, 160b (collectively 160) formed respectively thereon for protecting the negative electrode structure 140 from contaminants, such as ambient oxidants. In implementations where the negative electrode 140 has a pre-lithiation layer (e.g., lithium metal layer) formed thereon, the protective film 160 is formed on the pre-lithiation layer. The protective film 160 can be a laminate film and/or a passivation film. The protective film 160 can be permeable to at least one of lithium ions and lithium atoms. The protective film 160 provides surface protection of the negative electrode structure 140, which allows for handling of the negative electrode structure 140 in a dry room and can contribute to stable SEI formation. Examples of materials that can be used to form the protective film 160 include, but are not limited to, a lithium fluoride (LiF) film, a lithium carbonate ($Li_2CO_3$) film, a lithium oxide film, a lithium nitride ($Li_3N$) film, a lithium phosphate ($Li_3PO_4$) film, a lithium chloride (LiCl) film, lithium alkyl silanolate based film, an alkyl siloxane based film, a polyethylene (PE) film, a polypropylene (PP) film, a polystyrene (PS) film, or other polymer film that does not react with lithium, a poly(acrylic acid), ethylene vinyl acetate, or other polymer film that reacts with lithium, or combinations thereof.

The protective film 160 can be formed on the negative electrode structure 140 or pre-lithiation layer by vapor deposition methods, for example, chemical vapor deposition (CVD), atomic layer deposition (ALD), physical vapor deposition (PVD), such as thermal evaporation or sputtering. In some implementations, the protective film 160 is deposited on the negative electrode structure 140 above the melting point of lithium to facilitate chemical bonding. The protective film 160 can be formed on the negative electrode structure 140 by a lamination process. The protective film 160 can be deposited below the melting point of lithium and then the negative electrode structure 140 heat-treated up to or above the melting point of lithium.

The protective film includes a thermoplastic film, such as a polyethylene, a polypropylene, a poly(ethylene terephthalate), a poly(butylene terephthalate), a polyester, a polyamide, a polyaramid, a polyacrylate, a polycarbonate, a poly(ester carbonate), a polybenzimidazole, a polyimide, a polyether imide, a polyamide imide, and the like.

The protective film 160 can be a conformal coating or a discrete film, either having a thickness in the range of 1 nanometer to 2,000 nanometers (e.g., in the range of 10 nanometers to 600 nanometers; in the range of 50 nanometers to 100 nanometers; in the range of 50 nanometers to 200 nanometers; in the range of 100 nanometers to 150 nanometers). In one example, the protective film 160 is a discrete film having a thickness in the range of 1 micron to 50 microns (e.g., in the range of 1 micron to 25 microns). Coating process parameters control the protective surface properties of the protective film 160 including, for example, mechanical durability, hydrophobicity, and stickiness. Properties of the protective film 160 can be optimized to minimize reaction with air for extending coated web usable shelf life, to facilitate battery substrate and device manufacturability including web handling, and to contribute to stable SEI formation during battery assembly and charging.

Figure 2:
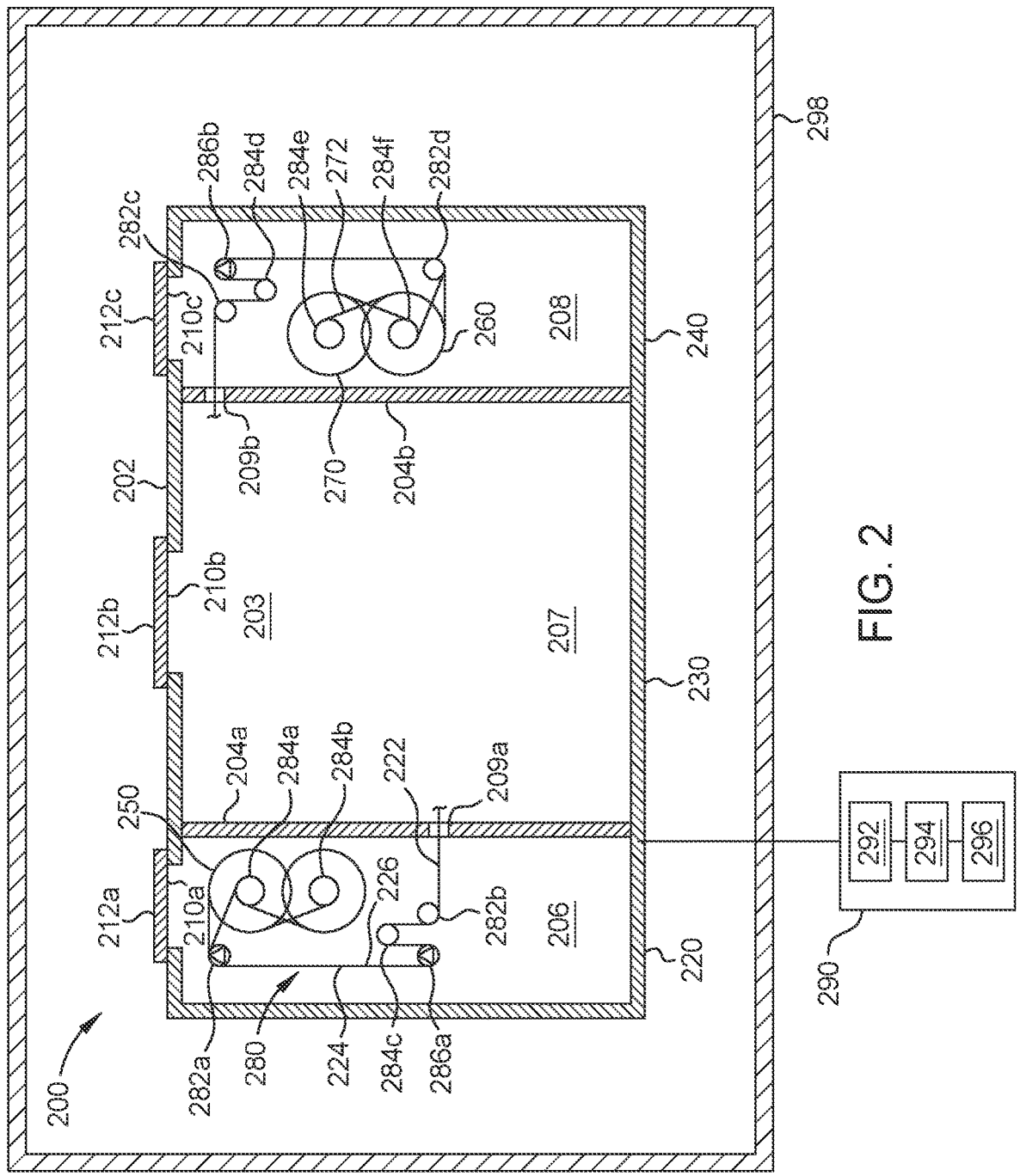
FIG. 2 illustrates a schematic cross-sectional view of a roll-to-roll coating system according to one or more implementations described herein.

FIG. 2 illustrates a cross-sectional view of a molten metal coating system 200 according to one or more implementations described herein. The molten metal coating system 200 includes a molten metal coating module 230 according to one or more implementations described herein. The molten metal coating system 200 further includes an unwinding module 220 operable to supply a flexible substrate such as a continuous flexible substrate 222 to the molten metal coating module 230. In one example, the continuous flexible substrate 222 prior to processing includes negative current collector 150 and molten metal is formed directly on the current collector using the molten metal coating system 200. In another example, the continuous flexible substrate 222 prior to processing includes negative current collector 150 and negative electrode structure 140 formed thereon and molten metal is formed directly on the negative electrode structure 140 using the molten metal coating system 200. The molten metal coating module 230 further includes a winding module 240 operable to collect the flexible substrate from the molten metal coating module 230. The molten metal coating system 200 can be operable for either single-sided or double-sided processing of a flexible substrate. In some implementations, the molten metal coating system 200 is operable for depositing molten metal (e.g., molten lithium) on flexible substrates followed by forming a passivation film or a laminate film on the as deposited molten metal.

The molten metal coating system 200 can include any suitable structure, configuration, arrangement, and/or components that enable the molten metal coating system 200 to deposit molten metal and/or passivate the deposited molten metal on the continuous flexible substrate 222 according to implementations of the present disclosure. For example, in some implementations the molten metal coating system 200 includes, but is not limited to, suitable deposition systems including kiss-coater rollers, Meyer bars, gravure rollers, air bearings, power sources, individual pressure controls, deposition control systems, load cells, servomotors, and temperature control components.

In some implementations, the molten metal coating system 200 includes a chamber body 202. The chamber body 202 can be fabricated from standard materials, such as aluminum, quartz, ceramic, or stainless steel. The chamber body 202 can be cooled by a fluid such as, for example, water and/or a glycol-based fluid. The chamber body 202 defines an interior volume 203. Partition plates 204a, 204b (collectively 204) extend across the interior volume 203 defined by the chamber body 202. The partition plate 204a separates the interior volume 203 into an unwinding volume 206 operable to supply the continuous flexible substrate 222 and a processing volume 207 in which molten metal is deposited on the continuous flexible substrate 222. The partition plate 204b separates the interior volume 203 into the processing volume 207 and a winding volume 208 operable to collect the processed continuous flexible substrate 222. The partition plates 204a, 204b include one or more slits 209a, 209b (collectively 209) respectively for accommodating the continuous flexible substrate 222. Each slit 209 in the partition plate 204 is sized to accommodate the continuous flexible substrate 222 while enabling differential pumping between the unwinding volume 206, the processing volume 207, and/or the winding volume 208.

In some implementations, an inert gas environment is maintained in at least one of the unwinding volume 206, the processing volume 207, and/or the winding volume 208. The inert gas environment can include an inert gas selected from argon, nitrogen, or combinations of argon and nitrogen. The inert gas environment of the unwinding volume 206, the processing volume 207, and/or the winding volume 208 isolates (e.g., provides gas separation) from the substantially ambient (e.g., atmospheric) environment outside of the molten metal coating system 200, which reduces the likelihood of contamination of the as deposited lithium film. This inert gas environment of the unwinding volume 206, the processing volume 207, and/or the winding volume 208 also isolates (e.g., provides gas separation) the unwinding volume 206 from the processing volume 207 and the processing volume 207 from the winding volume 208, if targeted. This isolation enables use of incompatible chemistries in the unwinding volume 206, the processing volume 207, and/or the winding volume 208. In one example, the processing volume 207 contains an argon gas environment and the winding volume 208 contains a combination of argon and a passivation gas (e.g., nitrogen).

In some implementations, at least one of the unwinding volume 206, the processing volume 207, and the winding volume 208 is coupled to a pressure control system (not shown), which pumps down and vents the unwinding volume 206, the processing volume 207, and/or the winding volume 208 as needed to facilitate passing the continuous flexible substrate 222 between the inert gas environment and the substantially ambient (e.g., atmospheric) environment outside of the molten metal coating system 200.

The chamber body 202 includes one or more openings 210a, 210b, 210c (collectively 210) for providing access to the interior volume 203. In one example, as depicted in FIG. 2, the one or more openings 210 are positioned at a top of the chamber body 202. The one or more openings 210 can be positioned at other locations of the chamber body 202, which provide access to the chamber components. The chamber body 202 can optionally include a lid 212a, 212b, 212c (collectively 212) that can open and close to allow the user access to components within the interior volume 203 of the chamber body 202. In one example, the chamber body 202 includes transparent portions or windows used to monitor processing conditions within the chamber.

It should be understood that although the unwinding volume 206, the processing volume 207, and the winding volume 208 are shown as sharing a common chamber body 202, in some implementations, the unwinding volume 206, the processing volume 207, and the winding volume 208 are defined by separate chamber bodies with the chamber body defining the unwinding volume 206 stacked upon or adjacent to (e.g., side-by-side) the chamber body defining the processing volume 207, and/or the winding volume 208. For example, in some implementations, the molten metal coating system 200 includes an unwinding chamber, which defines the unwinding volume 206, a deposition chamber, which defines the processing volume 207, and a separate winding chamber, which defines the winding volume 208. The unwinding chamber, the deposition chamber, and the winding chamber are separate modular and stackable elements. In one example, the unwinding chamber is positioned adjacent to the deposition chamber and the winding chamber is positioned adjacent to the deposition chamber.

The molten metal coating system 200 is constituted as a roll-to-roll system including the unwinding module 220 operable to supply the continuous flexible substrate 222, the molten metal coating module 230 operable to deposit molten metal on the continuous flexible substrate 222, and the winding module 240 operable to form a passivation film and/or laminate film on the molten metal in the winding module 240. The unwinding module 220 includes an unwinding roller 250 operable to supply the continuous flexible substrate 222. The winding module 240 includes a winding roller 260 operable to accept the processed continuous flexible substrate 222. The molten metal coating system 200 can further include a laminate film supply roller 270 operable to supply a protective film 272 to the processed continuous flexible substrate 222.

The continuous flexible substrate 222 is provided as a web, which is wound up on a roll, such as the unwinding roller 250. In one example, the continuous flexible substrate 222 has a width in a range from 15 cm to 300 cm, and typically has a width of approximately 160 cm. In another example, the continuous flexible substrate 222 has a width in a range from 5 cm to 200 cm, and typically has a width of approximately 10 cm. The continuous flexible substrate 222 has a thickness in a range from 8 μm to 200 μm, for example, a thickness of approximately 50 μm. The continuous flexible substrate 222 has a front surface 224 and a back surface 226. In some implementations, after processing, the continuous flexible substrate 222 includes a flexible material having a lithium electrode structure and a passivation film formed thereon. For example, after processing, the continuous flexible substrate 222 can be the negative current collector 150 having the negative electrode structure 140 and protective film 160 formed thereon as shown in FIG. 1B. In one example, only the front surface 224 of the flexible substrate has a lithium film and a protective film formed thereon. In another example, both the front surface 224 and the back surface 226 have metal films and passivation films formed thereon.

In other implementations, after processing, the continuous flexible substrate 222 includes a flexible material having a negative electrode structure formed thereon, a lithium metal film formed on the negative electrode structure, and a passivation film formed thereon. For example, after processing, the continuous flexible substrate 222 includes the negative current collector 150 having the negative electrode structure 140, a metal film (e.g., lithium metal) formed on the negative electrode structure, and protective film 160 formed on the metal film. In one example, only the front surface 224 of the flexible substrate has the negative electrode structure 140, the metal film, and a protective film 160 formed on the metal film. In another example, both the front surface 224 and the back surface 226 have negative electrodes, metal films and passivation films formed thereon.

In some implementations, the molten metal coating system 200 further includes one or more molten metal coating modules 230 operable to deposit a molten metal film on the continuous flexible substrate 222 optionally followed by formation of a protective film on the as deposited molten metal film. In one example, the one or more molten metal coating modules 230 are operable to perform free-span processing of the continuous flexible substrate 222. In one implementation, the molten metal coating system 200 is operable to simultaneously or quasi-simultaneously process opposing sides of the continuous flexible substrate 222. For example, a first molten metal application assembly faces the front surface 224 of the continuous flexible substrate 222 and a second molten metal application assembly faces the back surface 226 of the continuous flexible substrate 222. In another implementation, the molten metal coating system 200 is designed to sequentially process opposing sides of the continuous flexible substrate 222. For example, a first molten metal application assembly faces the front surface 224 of the continuous flexible substrate 222 and a second molten metal application assembly is positioned downstream from the first molten metal application assembly and faces the back surface 226 of the continuous flexible substrate 222.

In some implementations, the molten metal coating system 200 includes a common transport architecture 280. The common transport architecture 280 can include any transfer mechanism capable of moving the continuous flexible substrate 222 through the unwinding volume 206, the processing volume 207, and the winding volume 208. In some implementations, the common transport architecture 280 is a reel-to-reel system including the unwinding roller 250 and the winding roller 260. The unwinding roller 250 and the winding roller 260 can be individually heated or cooled depending upon the targeted process conditions. The unwinding roller 250 and the winding roller 260 can be individually heated either using an internal heat source positioned within each reel or an external heat source. The unwinding roller 250 and the winding roller 260 can be individually cooled using either an internal cooling source positioned within each reel or an external cooling source.

In some implementations, the common transport architecture 280 further includes one or more auxiliary tension reels 282a-282g (collectively 282) positioned between the unwinding roller 250 and the winding roller 260. The auxiliary tension reels are disposed along the substrate travel direction 228 where the continuous flexible substrate 222 is conveyed between the unwinding roller 250 and the winding roller 260, to allow a tensile force to the continuous flexible substrate 222. This tensile force prevents the continuous flexible substrate 222 from sagging down as well as to change the movement direction of the continuous flexible substrate 222. Accordingly, even though the continuous flexible substrate 222 is moved along a continuously long path, a certain movement rate is constantly maintained. In some implementations, any of the auxiliary tension reels 282 can be replaced with gas cushion rollers. The auxiliary tension reels 282 can be individually heated either using an internal heat source positioned within each reel or an external heat source. The auxiliary tension reels 282 can be individually cooled using either an internal cooling source positioned within each reel or an external cooling source.

In some implementations, the common transport architecture 280 further includes one or more servomotors 284a-284f (collectively 284) for advancing the continuous flexible substrate 222. The one or more servomotors 284 allow for precise control of linear position, velocity, and/or acceleration of the continuous flexible substrate 222. The one or more servomotors can be coupled with a sensor for position feedback.

In some implementations, the common transport architecture 280 further includes one or more load cells 286a-286b (collectively 286) for converting web tension into an electrical signal that can be measured and standardized.

In some implementations, the molten metal coating system 200 further includes the laminate film supply roller 270 operable to supply the protective film 272 to the processed continuous flexible substrate 222. The protective film 272 provides protection to the processed continuous flexible substrate 222. The protective film 272 is removed prior to combining the processed continuous flexible substrate 222 with a cathode structure to form an energy storage device (e.g., a lithium-ion storage device or capacitor). In one example, the protective film 272 includes a thermoplastic film, such as a polyethylene, a polypropylene, a poly(ethylene terephthalate), a poly(butylene terephthalate), a polyester, a polyamide, a polyaramid, a polyacrylate, a polycarbonate, a poly(ester carbonate), a polybenzimidazole, a polyimide, a polyether imide, a polyamide imide, and the like. The laminate film supply roller 270 is positioned in the winding volume 208 to supply the protective film 272 to the front surface 224 of the continuous flexible substrate 222 after processing and prior to winding the continuous flexible substrate 222 on the winding roller 260.

Generally, the molten metal coating system 200 includes a system controller 290 operable to control the automated aspects of the molten metal coating system 200. The system controller 290 can be provided and coupled to various components of the molten metal coating system 200 to control the operation thereof. The system controller 290 includes a central processing unit (CPU) 292, a memory 294, and support circuits 296. The system controller 290 can control the molten metal coating system 200 directly, or via computers (or controllers) associated with particular process chamber and/or support system components. The system controller 290 can be one of any form of general-purpose computer processor that can be used in an industrial setting for controlling various chambers and sub-processors. The memory, or computer readable medium, 294 of the system controller 290 can be one or more of readily available memory such as random access memory (RAM), read only memory (ROM), floppy disk, hard disk, optical storage media (e.g., compact disc or digital video disc), flash drive, or any other form of digital storage, local or remote. The support circuits 296 are coupled to the CPU 292 for supporting the processor in a conventional manner. These circuits include cache, power supplies, clock circuits, input/output circuitry and subsystems, and the like. The methods as described herein can be stored in the memory 294 as software routine that can be executed or invoked to control the operation of the molten metal coating system 200 in the manner described herein. The software routine can also be stored and/or executed by a second CPU (not shown) that is remotely located from the hardware being controlled by the CPU 292. In one example, the system controller 290 is operable to control the travel rate of the continuous flexible substrate 222 by monitoring load cells 286 and controlling the servomotors 284.

In one implementation, the molten metal coating system 200 is positioned in a secondary containment unit 298. In one implementation, the secondary containment unit 298 is a glove box, which is filled with an inert gas, such as argon.

In operation, the continuous flexible substrate 222 is conveyed from the unwinding roller 250 advancing into the molten metal coating module 230. The continuous flexible substrate 222 travels from the unwinding volume 206 through slit 209a, advancing into the processing volume 207 of the molten metal coating module 230. In the processing volume 207, the continuous flexible substrate 222 is exposed to a coating process to deposit a molten metal film on the continuous flexible substrate 222. The continuous flexible substrate 222 travels through slit 209b, advancing from the processing volume 207 into the winding volume 208. In the winding volume 208, the protective film 272 is supplied onto the molten metal film on the front surface 224 of the processed continuous flexible substrate 222 prior to winding the processed continuous flexible substrate 222 on the winding roller 260.

Figure 3A:
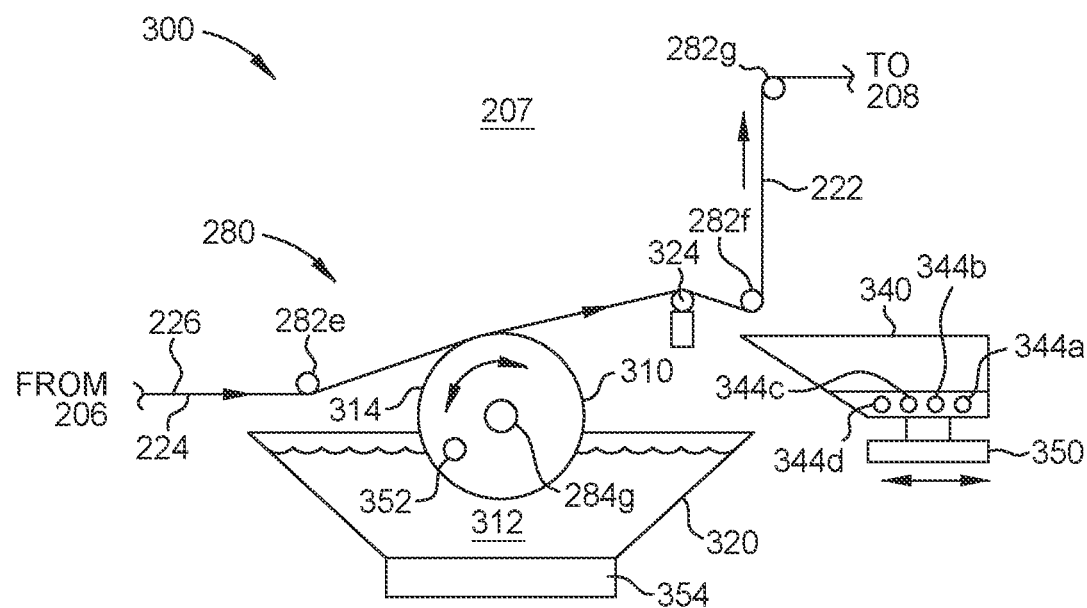
FIG. 3A illustrates a schematic cross-sectional view of one example of a kiss coating module according to one or more implementations described herein.

FIG. 3A illustrates a schematic cross-sectional view of one example of a kiss coating module 300 according to one or more implementations described herein. The kiss coating module 300 can be used in place of the molten metal coating module 230 depicted in FIG. 2. The kiss coating module 300 includes a pick-up roll or kiss roller 310. The kiss roller 310 is a cylinder (e.g., a steel cylinder) having a surface 314. The surface 314 can be smooth surface. The surface 314 picks up by contact a wet film comprising molten metal 312, such as molten lithium, from a primary melt pool 320 and delivers it to the front surface 224 of the moving continuous flexible substrate 222. The kiss roller 310 can further include a servomotor 284g.

In one implementation, the kiss roller 310 contacts the continuous flexible substrate 222 while traveling in an anti-direction meaning that the kiss roller rotates in a direction that is opposite the travel direction of the continuous flexible substrate 222 (i.e., contact in anti-direction). In another implementation, the kiss roller 310 does not contact the continuous flexible substrate 222 while rotating in the same direction as the travel direction of the continuous flexible substrate 222 (i.e., contact-free in co-direction). In yet another implementation, the kiss roller 310 contacts the continuous flexible substrate 222 while rotating in the same direction as the travel direction of the continuous flexible substrate 222 (i.e., contact in co-direction).

The kiss coating module 300 further includes a Meyer rod 324, which is positioned downstream from the kiss roller 310. After the wet film is applied to the front surface 224 of the continuous flexible substrate 222, the continuous flexible substrate 222 is then drawn across the Meyer rod 324. The Meyer rod 324, which functions as a metering device, is operable to control the gap and shape of the downstream molten metal meniscus formed on the continuous flexible substrate 222. Metering allows for production of repeatable and uniformly thick coating of molten metal coatings. In one example, the Meyer rod 324 is a ¼ inch to ½ inch diameter stainless steel drill rod stock individually spirally wrapped with various gauges of stainless steel wire. Between each wrap (turn of wire) is a "V" groove shape: as wire gauge increases, the size of the groove becomes larger, thus allowing a thicker layer of the wet film to be defined on the front surface 224 of the continuous flexible substrate 222. The Meyer rod 324, for example, ensures that a fairly uniform wet film of approximately 10 to 20 microns can be wet cast onto the continuous flexible substrate 222.

The kiss coating module 300 can further include auxiliary tension reels 282e-282g. In addition, the kiss coating module 300 can further include additional kiss rollers, Meyer bars, gravure rollers, air bearings, power sources, individual pressure controls, deposition control systems, load cells, servomotors, and temperature control components.

The kiss coating module 300 further includes the primary melt pool 320 operable to supply molten metal to the kiss roller 310 enabling the transfer of molten metal onto the continuous flexible substrate 222. The kiss coating module 300 further includes a secondary melt pool 340 operable to supply the primary melt pool 320 with molten metal at a targeted temperature. The primary melt pool 320 and the secondary melt pool 340 can be decoupled from each other. In some implementations, where the primary melt pool 320 and the secondary melt pool 340 are decoupled from each other, the secondary melt pool 340 is operable for melting metal ingots to form the molten metal.

In one implementation, the secondary melt pool 340 is coupled with an engagement mechanism 350. The engagement mechanism 350 is operable to move the secondary melt pool 340 radially toward the primary melt pool 320. In one example, the engagement mechanism 350 is a pneumatic cylinder. Other suitable engagement mechanisms capable of moving the secondary melt pool 340 radially toward and radially away from the primary melt pool 320 can be used. For example, hydraulic cylinders, pneumatic cylinders, and motorized sliders are alternatives.

In one implementation, the kiss roller 310 includes one or more internal heater(s) 352, for example, a coaxial cartridge heater. The internal heater 352 is operable to keep the wetted surfaces above the melting temperature of the molten metal to prevent premature solidification. Other heating methods and apparatus such as, for example, heater fluid bars and rollers, embedded electric resistance heaters, infrared heating lamps, and contact heaters, can be used. Electrical power can be fed to the internal heater(s) 352 through one or more slip ring assemblies. However, the thermal operating limit of the slip ring assemblies, which is typically lower than the target set point temperature of the roller. In one implementation, the rotating slip ring assemblies are isolated from the kiss roller 310 with a poor thermal conductor adaptor, for example, an adapter made from PEEK or other similar materials.

In one implementation, the kiss roller 310 and/or the Meyer bar is pre-loaded, for example, spring loaded. Pre-loading of the kiss roller 310 and/or Meyer bar ensures continuous contact of the kiss roller 310 with the continuous flexible substrate 222. In one implementation, constant force hydraulic cylinders, constant force pneumatic cylinders, or motorized sliders are used to move the kiss roller 310 and/or the Meyer bar. Pre-loading of the kiss roller 310 and/or the Meyer bar against the continuous flexible substrate 222 helps compensate for thermal expansion of the gap defining components during thermal ramping and changes.

The primary melt pool 320 is operable to supply sufficient molten metal to the kiss roller 310 enabling the transfer of molten metal to the continuous flexible substrate 222. In one implementation, the primary melt pool 320 is positioned on a heater 354 operable to maintain the molten metal 312 in a molten state. The primary melt pool 320 can include one or more internal heaters operable to keep the molten material in a molten state. The one or more internal heaters can be, for example, coaxial cartridge heaters.

The secondary melt pool 340 is operable to supply sufficient molten metal to the primary melt pool 320 at a targeted temperature. In one implementation, the secondary melt pool 340 includes one or more internal heaters 344a-d (collectively 344) operable to melt the metal ingots and keep the molten material in a molten state. The one or more internal heaters 344 can be, for example, coaxial cartridge heaters. The secondary melt pool 340 can be a hinged pool with an actuator that controls the tilt of the secondary melt pool 340 causing the molten metal to flow over a ledge into the primary melt pool 320. The primary melt pool 320 can be coupled with a load cell, which provides a load cell signal of a direct weight measurement of the primary melt pool 320. The load cell signal is fed back to the system controller 290. In one implementation, sensors (e.g., optical, capacitive, ultrasonic or the like) detect a lower and upper level range of the molten metal respectively and provide the signals to the system controller 290 for the actuator motion. The actuator can be a pneumatic cylinder plumbed to a proportional control valve.

In another implementation, the primary melt pool 320 is replenished with high purity material in the form of a wire or foil. The wire or foil is preheated to below the melt temperature to minimize thermal loss in the primary melt pool 320 and acts as a thermal sink. A drive mechanism controls the feed rate of the wire or foil resulting in a known flow rate based on a known cross section. The flow rate matches the product of deposition cross section and web speed.

Figure 3B:
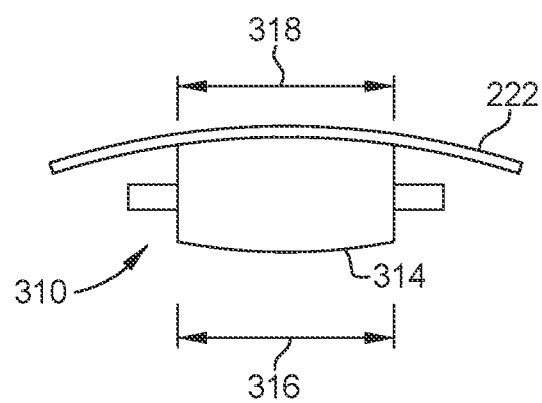
FIG. 3B illustrates a schematic cross-sectional view of one example of a kiss roller that can be used with the coating module of FIG. 3A according to one or more implementations of the present disclosure.

FIG. 3B illustrates a schematic cross-sectional view of one example of a kiss roller 310 that can be used with the coating module of FIG. 3A according to one or more implementations of the present disclosure. In one implementation, the surface 314 of the kiss roller 310 is a convex surface or a "crowned" surface. Not to be bound by theory but it is believed that crowning the surface of the kiss roller to make a length 316 of the convex portion of the surface 314 substantially equal to a length 318 of the heated section of the foil minimizes wrinkles and homogenizes pressure in the contact zone. In the cold state, the continuous flexible substrate 222 contacts the surface 314 of the kiss roller 310 in the center, whereas in the heated state, the continuous flexible substrate 222 contacts entire surface 314 of the kiss roller 310.

Figure 4:
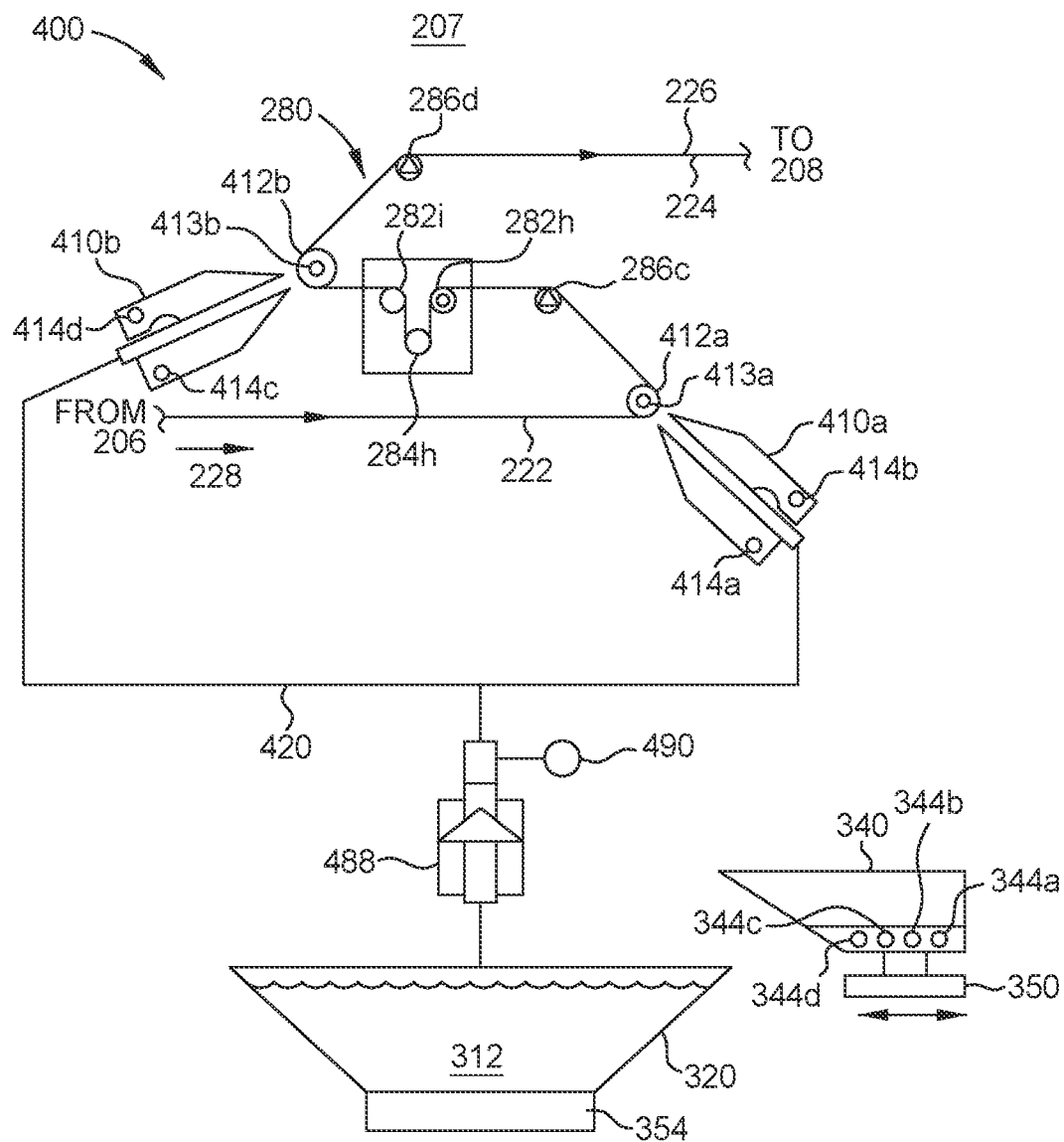
FIG. 4 illustrates a schematic cross-sectional view of one example of a slot-die coating module according to one or more implementations described herein.

FIG. 4 illustrates a schematic cross-sectional view of a slot-die coating module 400 according to one or more implementations described herein. The slot-die coating module 400 can be used in place of the molten metal coating module 230 depicted in FIG. 2. The slot-die coating module 400 includes one or more slot-die 410a, 410b (collectively 410) operable to deposit a wet film comprising molten metal on the continuous flexible substrate. In one implementation, the one or more slot-die 410a, 410b are arranged to process opposing sides of the continuous flexible substrate 222. For example, as depicted in FIG. 4, a first slot-die 410a faces the front surface 224 of the continuous flexible substrate 222 and a second slot-die 410b faces the back surface 226 of the continuous flexible substrate 222.

In one implementation, the one or more slot-die 410 are positioned in the processing volume 207 such that the slot-die delivers the material to be deposited at an angle relative to a substrate travel direction 228 of the continuous flexible substrate 222. The one or more slot-die 410 can be positioned such that a material to be deposited on the continuous flexible substrate 222 is delivered in a substantially perpendicular orientation relative to the substrate travel direction 228 of the continuous flexible substrate 222. The one or more slot-die 410 can be positioned such that a material to be deposited on the continuous flexible substrate 222 is delivered simultaneously on opposing sides of the continuous flexible substrate 222 in free span in a substantially perpendicular orientation relative to the substrate travel direction 228 of the continuous flexible substrate 222. In one implementation, a material to be deposited is delivered in an outflow direction having an angle between about 0 and 60 degrees relative to the horizon, for example, between about 1 degree and about 45 degrees, such as between about 5 degrees and about 15 degrees. In another implementation, a material to be deposited is delivered in an outflow direction having an angle between about 180 and 240 degrees relative to the horizon, for example, between about 181 degree and about 225 degrees, such as between about 185 degrees and about 195 degrees.

In one implementation, the slot-die 410 includes one or more heaters 414a-414d (collectively 414) operable to control the temperature of the molten metal within the slot-die 410. The slot-die operating temperature is typically set to maximize wetting control, which is dependent on the molten metal flowing through the slot-die. The slot-die 410 can be operated in bead mode where a gap is present between the lips of the slot die and the surface of the continuous flexible substrate 222. The slot-die can be operated in impregnation mode where the lips of the slot-die contact the continuous flexible substrate 222.

The common transport architecture 280 of the slot-die coating module 400 can further include auxiliary tension reels 282h-282i. The common transport architecture 280 of the slot-die coating module 400 can further include process rollers 412a, 412b (collectively 412) over which the continuous flexible substrate 222 travels during deposition from each corresponding slot-die 410. The process rollers 412 can be heated in order to reduce the number of wrinkles that form in the continuous flexible substrate 222 as the continuous flexible substrate 222 travels over the process rollers 412. In implementations where the process roller is heated, the process roller includes one or more internal heater(s) 413a, 413b (collectively 413), for example, a coaxial cartridge heater. The common transport architecture 280 of the slot-die coating module 400 can further include load cells 286c, 286d. The common transport architecture 280 of the slot-die coating module 400 can further include a servomotor 284h. In addition, the slot-die coating module 400 can further include additional slot-die, Meyer bars, gravure rollers, air bearings, power sources, individual pressure controls, deposition control systems, additional load cells, additional servomotors, and temperature control components.

The slot-die coating module 400 further includes a molten metal replenishment system. Similar to the kiss coating module 300, the slot-die coating module 400 includes a primary melt pool 320 and a secondary melt pool 340. The primary melt pool 320 supplies molten metal to each of the slot-die 410a, 410b. The primary melt pool 320 is fluidly coupled with each of the slot-die 410a, 410b via a fluid supply line 420.

The molten metal replenishment system further includes a pump 488 operable to move the liquid lithium from the primary melt pool 320 to the slot-die 410. The molten metal replenishment system optionally includes a flow meter 490 operable to monitor the flow of liquid lithium through the supply line 420. In at least one aspect, the flow meter 490 is positioned downstream from the pump 488. The pump 488 can be any suitable pump operable to move the molten metal. In at least one aspect, the pump 488 is an electromagnetic pump that moves molten metal using electromagnetism. The electromagnetic pump can be an electromagnetic pump of any type. In at least one aspect, the electromagnetic pump causes an electromagnetic force to act on the molten metal by an induced current flowing through the liquid lithium due to a moving magnetic field generated by a direct or alternating current and the moving magnetic field, thus discharging the liquid lithium in the same direction as a moving direction of the magnetic field. The flow meter 490 can be any suitable flow meter for measuring the flow of the liquid lithium. The flow meter 490 can communicate with the pump 488 and/or a shut-off valve via a feedback loop (not shown).

Figure 5:
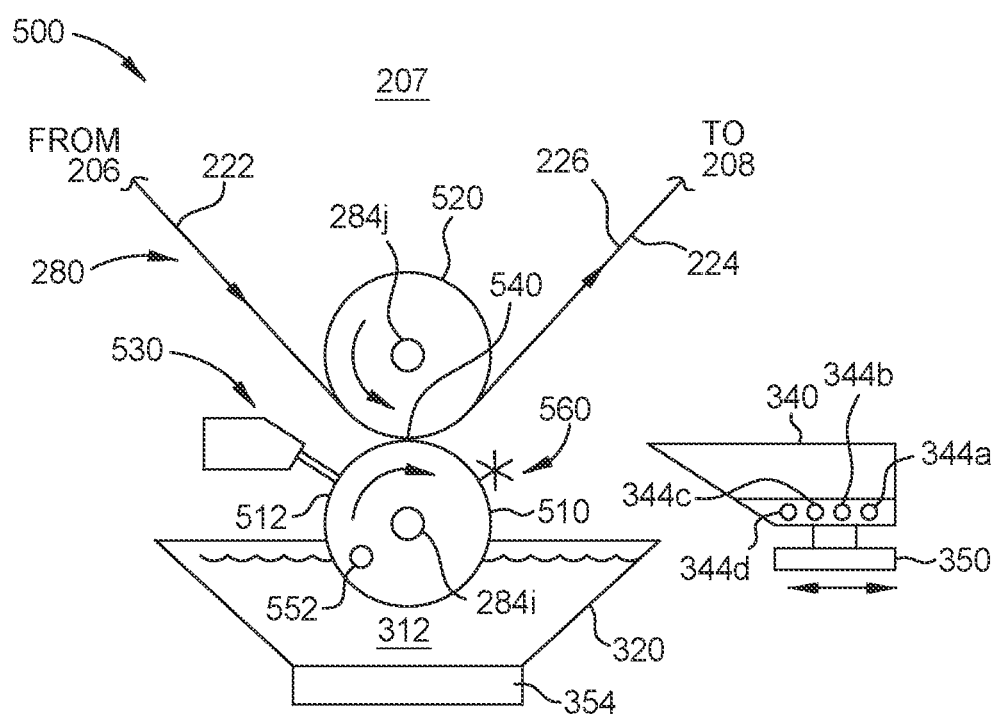
FIG. 5 illustrates a schematic cross-sectional view of one example of a gravure coating module according to one or more implementations described herein.

FIG. 5 illustrates a schematic cross-sectional view of one example of a gravure coating module 500 according to one or more implementations described herein. The gravure coating module 500 can be used in place of the molten metal coating module 230 depicted in FIG. 2. The gravure coating module 500 includes a gravure roller 510, a backup roller 520, and a doctor blade 530. The gravure roller 510 is a cylinder (e.g., a steel cylinder) that picks up by contact a wet film comprising of molten metal 312, such as molten lithium from the primary melt pool 320 and delivers it to the front surface 224 of the moving continuous flexible substrate 222. The gravure roller 510 has a surface 512 that includes at least one of stainless steel, copper, chromium, or a combination thereof. In one example, the surface of the gravure roller 510 is stainless steel. The surface of the gravure roller 510 has patterned or engraved portions. Examples of engraved surfaces of the gravure roller 510 include separate cavities, connected cavities formed by sinusoidal lines leaving a channel open for exchange, and/or helical grooves. The gravure roller 510 can be heated by an internal heater, such as the internal heater 552.

The gravure roller 510 can further include a servomotor 284*i*. The level of molten metal 312 in the primary melt pool 320 is such that wetting contact with the gravure roller 510 is maintained. The doctor blade 530 removes excess molten metal from the gravure roller so that only the engraved portions of the surface 512 of the gravure roller 510 hold molten metal 312. The backup roller 520 presses the continuous flexible substrate 222 against the gravure roller 510 to form nip 540. The backup roller 520 can further include a servomotor 284*j*. Within the nip 540, a portion of the molten metal is transferred to the continuous flexible substrate 222. In one implementation, the doctor blade 530 is replaced with a copper sponge. The backup roller 520 is a cylinder (e.g., a silicone cylinder).

In one implementation, the gravure roller 510 contacts the continuous flexible substrate 222 while traveling in an anti-direction meaning that the gravure roller 510 rotates in a direction that is opposite the travel direction of the continuous flexible substrate 222 (i.e., contact in anti-direction). In another implementation, the gravure roller 510 does not contact the continuous flexible substrate 222 while rotating in the same direction as the travel direction of the continuous flexible substrate 222 (i.e., contact-free in co-direction). In yet another implementation, the gravure roller 510 contacts the continuous flexible substrate 222 while rotating in the same direction as the travel direction of the continuous flexible substrate 222 (i.e., contact in co-direction).

In one implementation, the gravure coating module 500 further includes a brush 560 operable to remove any film or skin material, for example, lithium films that can form in the cavities of the gravure roller 510. As depicted in FIG. 5, the brush 560 is positioned to remove material from the cavities in a portion of the gravure roller 510 prior to the portion of the gravure roller 510 contacting the molten metal 312 in the primary melt pool 320. The brush 560 removes contaminants and particles from the cavities of the gravure roller 510, which helps maintain the volume of the cavities formed in the surface of the gravure roller 510. The brush 560 is rotatable. The brush 560 can be actively heated.

In addition, the gravure coating module 500 can further include auxiliary tension rolls, process rollers, Meyer bars, air bearings, power sources, individual pressure controls, deposition control systems, load cells, servomotors, and temperature control components.

The gravure coating module 500 further includes a molten metal replenishment system. Similar to the kiss coating module 300, the gravure coating module 500 includes the primary melt pool 320 and a second melt pool 340 for replenishing the molten metal 312 in the primary melt pool 320.

Figure 6:
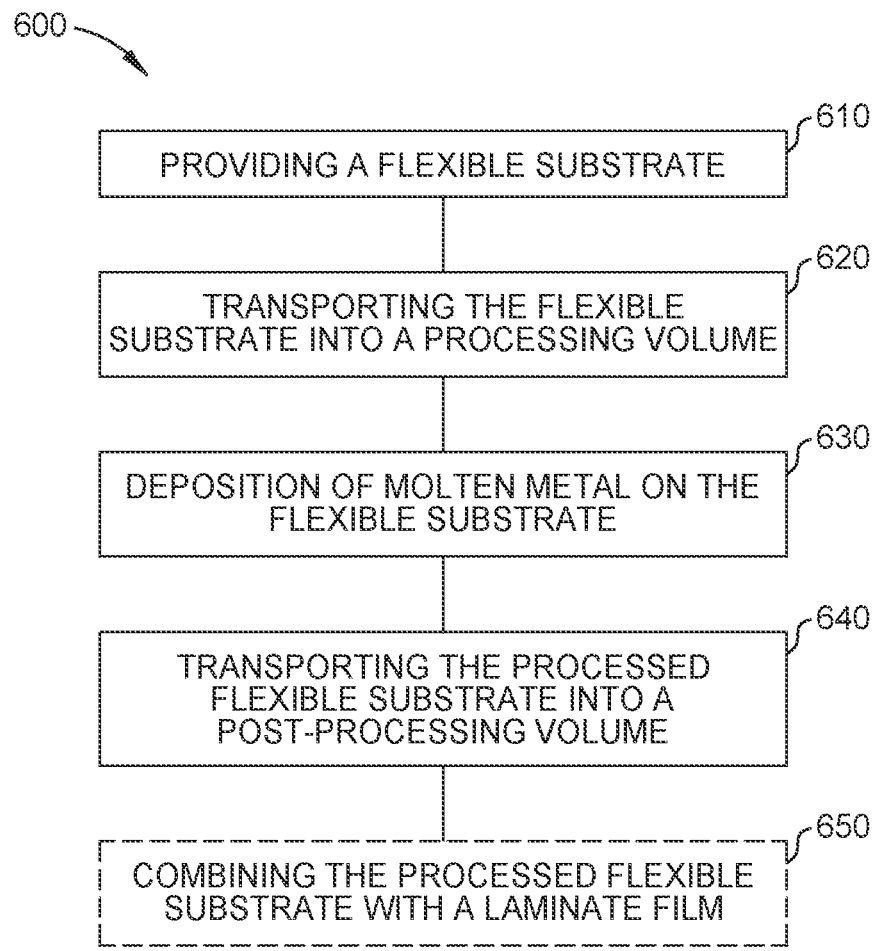
FIG. 6 illustrates a process flow chart summarizing one implementation of a processing sequence of forming a passivated lithium electrode structure according to one or more implementations of the present disclosure.

FIG. 6 illustrates a process flow chart summarizing one implementation of a processing sequence 600 of forming a lithium electrode structure according to one or more implementations of the present disclosure. The processing sequence 600 can be used to form a single-sided lithium electrode structure, for example, the lithium electrode structure depicted in FIG. 1A, or a dual-sided electrode structure, for example, the electrode structure depicted in FIG. 1B. The processing sequence 600 can be performed using, for example, the molten metal coating system 200 depicted in FIG. 2.

The processing sequence 600 begins at operation 610 by providing a flexible substrate. In one implementation, the flexible substrate is the continuous flexible substrate 222, which includes the negative current collector 150. In another implementation, the flexible substrate is the continuous flexible substrate 222, which includes the negative current collector 150 having the negative electrode structure 140 formed thereon. The flexible substrate is supplied by the unwinding roller 250 positioned in the unwinding module 220.

At operation 620, the flexible substrate is moved into the processing volume 207. Referring to FIG. 2, the continuous flexible substrate 222 is conveyed from the unwinding roller 250 into the processing volume 207. In some implementations, the processing volume 207 contains an inert gas environment such as an argon gas environment.

At operation 630, the continuous flexible substrate 222 is exposed to a molten metal (e.g., molten lithium) to deposit a thin layer of molten lithium on the continuous flexible substrate. The flexible substrate is moved through the molten metal coating module 230 where a thin layer of molten lithium is formed on the continuous flexible substrate 222 by the molten metal coating module 230.

In one implementation, the thin layer of molten lithium is deposited on the continuous flexible substrate 222 via a kiss coating process using a kiss coating module, such as the kiss coating module 300 depicted in FIG. 3. With reference to FIG. 3, molten lithium is applied to the continuous flexible substrate 222 by the kiss roller 310. During application of the molten lithium to the continuous flexible substrate 222, the kiss roller 310 is maintained a temperature such that the lithium remains in a molten state. The kiss roller 310 can be heated by an internal heater, such as the internal heater 352. The molten lithium coating is post metered by a wire wound rod, such as the Meyer rod 324 that remove excess molten lithium coating from the continuous flexible substrate 222. Typically, an excess of the molten lithium coating is deposited onto the continuous flexible substrate 222 as it passes the kiss roller 310. The Meyer rod 324 allows the targeted quantity of the molten metal coating to remain on the continuous flexible substrate 222. The quantity of molten metal coating is determined by the diameter of the wire used on the Meyer rod 324.

In another implementation, the thin layer of molten lithium is deposited on the continuous flexible substrate 222 via a slot-die process using a slot-die coating module, such as the slot-die coating module 400 depicted in FIG. 4. With reference to FIG. 4, a molten lithium coating is applied to the continuous flexible substrate 222 by the slot-die 410. The molten lithium coating can be applied to the front surface 224 of the continuous flexible substrate 222 via slot-die 410a and to the back surface 226 by the second slot-die 410b. During application of the molten lithium to the continuous flexible substrate 222, the slot-die is maintained at a temperature such that the lithium remains in a molten state.

In yet another implementation, the thin layer of molten lithium is deposited on the continuous flexible substrate 222 via a gravure coating process using a gravure coating module, such as the gravure coating module 500 depicted in FIG. 5. With reference to FIG. 5, molten lithium is applied to the continuous flexible substrate 222 by the gravure roller 510. The gravure roller 510 picks up by contact a wet film comprising molten lithium, such as molten lithium from the primary melt pool 320 and delivers it to the front surface 224 of the moving continuous flexible substrate 222. The doctor blade 530 removes excess molten lithium so that only the engraved portions of the circumferential surface of the gravure roller 510 hold molten metal 312. The backup roller 520 presses the continuous flexible substrate 222 against the gravure roller 510 to form nip 540. Within the nip 540, a portion of the molten metal is transferred to the continuous flexible substrate 222. During application of the molten lithium to the continuous flexible substrate 222, the gravure roller 510 is maintained a temperature such that the lithium remains in a molten state.

During operation 630, the level of molten metal 312 in the primary melt pool 320 is such that wetting contact with either the kiss roller 310 or the gravure roller 510 is maintained. In one implementation, the secondary melt pool 340 is used to melt metal ingots and maintain an ample supply of molten lithium to compensate for refilling the depleted molten lithium from the primary melt pool 320. In another implementation, the metal ingots are melted in the primary melt pool 320. Once sufficient molten lithium is available in the primary melt pool 320, the kiss roller 310, the slot-die 410, or the gravure roller 510 is exposed to a wetting process. Additional heat can be applied to the kiss roller 310, the slot-die 410, or the gravure roller 510 during the wetting process. Upon contact, molten lithium is transferred onto the continuous flexible substrate 222 coating the continuous flexible substrate 222 in a defined manner (width and thickness). The process continues until a targeted coating length is produced. After operation 630, the molten lithium can be solidified and melted again for the next run.

In one implementation, the processed continuous flexible substrate is exposed to a cooling process. The cooling process can be accomplished by passing the continuous flexible substrate 222 between two fluid cooled plates coupled via an appropriate coupling gas such as argon or helium. The cooling process can be accomplished using cooling plates, cooling drums, and/or cooling rollers.

At operation 640, the processed flexible substrate is moved into the winding volume 208. Referring to FIG. 2, in some implementations, the continuous flexible substrate 222 having the layer of lithium formed thereon is conveyed from the molten metal coating module 230 and passes through the slit 209b into the winding volume 208. In one implementation, the winding volume 208 contains an inert gas, a passivation gas, or combination of inert gas and passivation gas, such as an argon gas and nitrogen gas environment.

Optionally, at operation 650 the processed flexible substrate is combined with a laminate film. The laminate film prevents the rewound coated flexible substrate from sticking to itself. Referring to FIG. 2, the processed continuous flexible substrate 222 is combined with the protective film 272, which protects the processed front surface 224 of the processed continuous flexible substrate 222. The continuous flexible substrate 222 is then wound on the winding roller 260.

The continuous flexible substrate 222 can be subjected to additional processing. Additional processing can provide for deposition of a separator, an electrolyte soluble binder, or in some implementations, additional chambers can provide for formation of a positive electrode structure. In some implementations, additional chambers provide for cutting of the negative electrode. The laminate film can be removed after cutting of the negative electrode.

In summary, some of the benefits of the present disclosure include the efficient integration of molten metal deposition and lamination into a modular processing system. In addition, it has been found by the inventors that some implementations of the present disclosure reduce wrinkles and pattern formation when depositing molten metal on a substrate in a roll-to-roll process. A slight drop in temperature can alter the viscosity of the molten material to the point that the material transfer and the flow behavior of the molten material leads to inconsistent deposition thicknesses and non-uniformities. For these reasons, in some implementations, the surface temperature of the deposition applicators should remain above the melt temperature of the metal. There are multiple methods of heating and controlling a surface temperature of such applicators. In addition, methods and apparatus for maintaining the temperature of the molten metal baths prior to deposition are also provided.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there can be additional elements other than the listed elements.

While the foregoing is directed to implementations of the present disclosure, other and further implementations of the disclosure can be devised without departing from the basic scope thereof, and the scope thereof is determined by the claims that follow.

The invention claimed is:

1. A system, comprising:
a chamber body defining an interior volume;
a first partition plate extending across the interior volume separating the interior volume into a processing volume and an unwinding volume;
a second partition plate extending across the interior volume separating the interior volume into the processing volume and a winding volume;
a reel-to-reel system operable to transport a continuous flexible substrate, comprising:
an unwinding roller positioned in the unwinding volume, on which the continuous flexible substrate is wound prior to processing, and operable to unwind and release the continuous flexible substrate for the processing; and
a winding roller positioned in the winding volume and operable to receive the continuous flexible substrate following the processing, and operable to wind the continuous flexible substrate thereon; and
a molten metal coating assembly positioned in the processing volume and comprising:

a gravure roller having a patterned surface that picks up by contact a wet film comprising molten metal and deposits the wet film on the continuous flexible substrate;

a primary melt pool operable to supply the molten metal to the gravure roller;

a secondary melt pool operable to replenish the molten metal in the primary melt pool; and an engagement mechanism coupled with the secondary melt pool and operable to move the secondary melt pool radially toward and radially away from the primary melt pool.

2. The system of claim 1, further comprising a doctor blade positioned to removes excess molten metal from the gravure roller so that only patterned portions of the patterned surface of the gravure roller hold molten metal.

3. The system of claim 1, wherein the gravure roller comprises one or more internal heaters operable to control a temperature of the molten metal within the gravure roller.

4. The system of claim 1, further comprising one or more process rollers disposed along a travel path over which the continuous flexible substrate is conveyed between the unwinding roller, the gravure roller, and the winding roller.

5. The system of claim 4, wherein the process rollers are positioned so that the gravure roller deposits molten metal on the continuous flexible substrate while the continuous flexible substrate travels over one of the process rollers.

6. The system of claim 5, wherein the process rollers further comprises an internal heater.

7. The system of claim 1, further comprising a laminate film supply roller positioned in the winding volume and operable to supply a laminate film over the deposited molten metal.

8. The system of claim 1, further comprising one or more auxiliary tension reels disposed along a travel path where the continuous flexible substrate is conveyed between the unwinding roller, the gravure roller, and the winding roller.

9. The system of claim 1, wherein the engagement mechanism is a pneumatic cylinder.

10. The system of claim 1, where in the primary melt pool is positioned on a heater operable to maintain the molten metal in a molten state.

11. A system, comprising:
a chamber body defining an interior volume;
a first partition plate extending across the interior volume separating the interior volume into a processing volume and an unwinding volume;
a second partition plate extending across the interior volume separating the interior volume into the processing volume and a winding volume;
a reel-to-reel system operable to transport a continuous flexible substrate, comprising:
an unwinding roller positioned in the unwinding volume, on which the continuous flexible substrate is wound prior to processing, and operable to unwind and release the continuous flexible substrate for the processing; and
a winding roller positioned in the winding volume and operable to receive the continuous flexible substrate following the processing, and operable to wind the continuous flexible substrate thereon; and
a molten metal coating assembly positioned in the processing volume and comprising:
a gravure roller having a patterned surface that picks up by contact a wet film comprising molten metal and deposits the wet film on the continuous flexible substrate;
a primary melt pool operable to supply the molten metal to the gravure roller;
a secondary melt pool operable to replenish the molten metal in the primary melt pool; and
an engagement mechanism is a pneumatic cylinder and coupled with the secondary melt pool and operable to move the secondary melt pool radially toward and radially away from the primary melt pool.

12. The system of claim 11, further comprising a doctor blade positioned to removes excess molten metal from the gravure roller so that only patterned portions of the patterned surface of the gravure roller hold molten metal.

13. The system of claim 11, wherein the gravure roller comprises one or more internal heaters operable to control a temperature of the molten metal within the gravure roller.

14. The system of claim 11, further comprising one or more process rollers disposed along a travel path over which the continuous flexible substrate is conveyed between the unwinding roller, the gravure roller, and the winding roller.

15. The system of claim 14, wherein the process rollers are positioned so that the gravure roller deposits molten metal on the continuous flexible substrate while the continuous flexible substrate travels over one of the process rollers.

16. The system of claim 15, wherein the process rollers further comprises an internal heater.

17. The system of claim 11, further comprising a laminate film supply roller positioned in the winding volume and operable to supply a laminate film over the deposited molten metal.

18. The system of claim 11, further comprising one or more auxiliary tension reels disposed along a travel path where the continuous flexible substrate is conveyed between the unwinding roller, the gravure roller, and the winding roller.

19. The system of claim 11, wherein the engagement mechanism is operable to move the secondary melt pool radially toward and radially away from the primary melt pool.

20. The system of claim 11, where in the primary melt pool is positioned on a heater operable to maintain the molten metal in a molten state.

* * * * *